(12) United States Patent
Sundholm

(10) Patent No.: US 12,169,818 B2
(45) Date of Patent: Dec. 17, 2024

(54) SIMULTANEOUSLY DISPLAYING NEW PRICES LINKED TO PRODUCTS VIA AN ELECTRONIC PRICE LABEL SYSTEM

(71) Applicant: MARIELLA LABELS OY, Vantaa (FI)

(72) Inventor: Göran Sundholm, Tuusula (FI)

(73) Assignee: MARIELLA LABELS OY, Vantaa (FI)

( * ) Notice: Subject to any disclaimer, the term of this patent is extended or adjusted under 35 U.S.C. 154(b) by 0 days.

(21) Appl. No.: 16/097,965

(22) PCT Filed: Apr. 26, 2017

(86) PCT No.: PCT/FI2017/050316
§ 371 (c)(1),
(2) Date: Oct. 31, 2018

(87) PCT Pub. No.: WO2017/191359
PCT Pub. Date: Nov. 9, 2017

(65) Prior Publication Data
US 2019/0147425 A1 May 16, 2019

Related U.S. Application Data

(63) Continuation-in-part of application No. 15/146,322, filed on May 4, 2016, now abandoned.

(51) Int. Cl.
*G06Q 20/20* (2012.01)
*G06Q 10/087* (2023.01)
(Continued)

(52) U.S. Cl.
CPC ......... *G06Q 20/201* (2013.01); *G06Q 10/087* (2013.01); *G06Q 30/0206* (2013.01); *G09F 3/208* (2013.01)

(58) Field of Classification Search
None
See application file for complete search history.

(56) References Cited

U.S. PATENT DOCUMENTS 5,663,963 A * 9/1997 Goodwin, III ......... G06Q 30/06
714/704
5,771,005 A * 6/1998 Goodwin, III .......... G09F 3/204
340/5.91
(Continued)

FOREIGN PATENT DOCUMENTS

CN 103959315 A 7/2014
EP 0994431 A2 * 10/1999 ............. G06F 17/60
(Continued)

OTHER PUBLICATIONS

Sung, Jongwoo. "End of paper labels: Emerging smart labels toward Internet of Things." 2015 IEEE 2nd World Forum on Internet of Things (WF-IoT). IEEE, 2015. (Year: 2015).*

(Continued)

*Primary Examiner* — Timothy Padot
*Assistant Examiner* — Derick J Holzmacher
(74) *Attorney, Agent, or Firm* — Birch, Stewart, Kolasch & Birch, LLP

(57) ABSTRACT

An electronic price label system and a method for an electronic price label system include a product database in which products are listed. A new price of a product is sent to an electronic price label linked to the product. The received new price of a product is stored by the electronic price label. The electronic price label changes the displayed price to the received new price in response to receiving a price activation signal from the electronic price label system, e.g. from base station of the electronic price label system.

20 Claims, 4 Drawing Sheets

(51) Int. Cl.
*G06Q 30/0201* (2023.01)
*G09F 3/20* (2006.01)

(56) References Cited

U.S. PATENT DOCUMENTS

| | | | | |
|---|---|---|---|---|
| 5,794,215 | A * | 8/1998 | Goodwin, III | G06Q 30/0623 340/539.2 |
| 5,818,346 | A * | 10/1998 | Goodwin, III | G06Q 30/02 340/8.1 |
| 5,841,365 | A * | 11/1998 | Rimkus | G06Q 30/06 340/9.1 |
| 5,933,813 | A * | 8/1999 | Teicher | G06Q 30/0283 705/28 |
| 6,026,373 | A * | 2/2000 | Goodwin, III | G06Q 30/06 705/25 |
| 6,035,437 | A * | 3/2000 | Adamec | G06Q 99/00 714/48 |
| 6,044,359 | A * | 3/2000 | Goodwin, III | G06F 3/147 340/5.91 |
| 6,169,493 | B1 * | 1/2001 | Goodwin, III | G06Q 20/201 340/5.9 |
| 6,211,773 | B1 * | 4/2001 | Adamec | G06Q 30/06 340/5.91 |
| 6,243,690 | B1 * | 6/2001 | Adamec | G09F 9/30 340/5.1 |
| 6,269,342 | B1 * | 7/2001 | Brick | G06F 3/147 235/383 |
| 6,621,407 | B1 * | 9/2003 | Goodwin, III | G06Q 30/02 340/5.91 |
| 7,026,913 | B2 * | 4/2006 | Bhyravabhotla | G06Q 30/06 340/5.91 |
| 7,095,794 | B2 * | 8/2006 | Claessen | G06K 7/0008 375/282 |
| 7,152,040 | B1 | 12/2006 | Hawthorne et al. | |
| 7,286,798 | B1 * | 10/2007 | Dalton | G06Q 30/02 340/5.91 |
| 7,287,001 | B1 * | 10/2007 | Falls | G06Q 20/202 705/28 |
| 7,743,983 | B1 * | 6/2010 | Harkins | G06Q 20/201 235/383 |
| 8,061,601 | B1 * | 11/2011 | Harkins | G06Q 30/06 235/383 |
| 9,911,290 | B1 * | 3/2018 | Zalewski | G06Q 20/12 |
| 2002/0002421 | A1 * | 1/2002 | Murofushi | G06Q 20/201 700/214 |
| 2002/0109603 | A1 * | 8/2002 | Otto | H04B 10/114 340/691.1 |
| 2003/0076892 | A1 * | 4/2003 | Gerardus Claessen | G06K 7/0008 375/282 |
| 2003/0110093 | A1 * | 6/2003 | Sakamoto | H04L 51/00 705/26.41 |
| 2003/0132290 | A1 * | 7/2003 | Haulk | G06Q 20/201 235/383 |
| 2003/0132833 | A1 * | 7/2003 | Haulk | G06Q 20/201 340/5.91 |
| 2003/0133468 | A1 * | 7/2003 | Haulk | G06Q 30/06 370/468 |
| 2003/0135805 | A1 * | 7/2003 | Haulk | H04L 1/1685 714/748 |
| 2003/0135806 | A1 * | 7/2003 | Haulk | H04L 1/1685 714/749 |
| 2004/0012196 | A1 * | 1/2004 | Sundqvist | G06Q 20/201 283/81 |
| 2004/0012485 | A1 * | 1/2004 | Sundqvist | G06F 3/147 340/5.91 |
| 2005/0030158 | A1 * | 2/2005 | Schulmerich | G06F 3/1462 340/5.91 |
| 2005/0125297 | A1 * | 6/2005 | Goodwin, III | G06Q 30/06 705/20 |
| 2006/0100967 | A1 * | 5/2006 | Grimaldi | G06Q 40/00 705/400 |
| 2007/0181678 | A1 * | 8/2007 | Nilsson | G06Q 30/00 235/383 |
| 2009/0094140 | A1 * | 4/2009 | Kwan | G06Q 30/06 705/28 |
| 2009/0225000 | A1 | 9/2009 | Rosander et al. | |
| 2009/0273443 | A1 * | 11/2009 | Nilsson | G06F 3/147 340/5.91 |
| 2010/0065634 | A1 * | 3/2010 | Nakamura | G06Q 30/02 235/385 |
| 2010/0084543 | A1 | 4/2010 | Hou | |
| 2010/0138322 | A1 * | 6/2010 | Nakamura | G06Q 30/02 705/28 |
| 2010/0253472 | A1 * | 10/2010 | Hashiguchi | G06Q 30/06 340/5.91 |
| 2011/0025461 | A1 * | 2/2011 | Nobutsugu | G06Q 10/087 340/5.92 |
| 2011/0053517 | A1 * | 3/2011 | Wright | G06F 3/147 455/67.13 |
| 2013/0027189 | A1 * | 1/2013 | Karhuketo | G06K 19/0726 340/10.4 |
| 2013/0030871 | A1 * | 1/2013 | Schwitzky | G06Q 30/02 705/7.35 |
| 2013/0313317 | A1 * | 11/2013 | Waters | G06Q 10/08 235/487 |
| 2013/0343326 | A1 * | 12/2013 | Kivinen | G06Q 30/02 370/329 |
| 2014/0210692 | A1 * | 7/2014 | Waters | G06F 3/147 345/2.3 |
| 2014/0279126 | A1 * | 9/2014 | Schweiger | G06Q 30/0641 705/26.1 |
| 2014/0310068 | A1 | 10/2014 | Matsuoka et al. | |
| 2015/0035674 | A1 * | 2/2015 | Karhuketo | G06K 19/027 340/568.1 |
| 2015/0249838 | A1 | 9/2015 | Chang et al. | |
| 2016/0049102 | A1 | 2/2016 | Lee et al. | |
| 2017/0342731 | A1 * | 11/2017 | Virnes | G06K 19/077 |

FOREIGN PATENT DOCUMENTS

| | | | | |
|---|---|---|---|---|
| EP | 0973112 | A2 | 10/2000 | |
| EP | 1566755 | A1 | 8/2005 | |
| EP | 2950259 | A1 | 12/2015 | |
| EP | 2985725 | A1 | 2/2016 | |
| JP | 2000-48259 | A | 2/2000 | |
| JP | 2000-250497 | A | 9/2000 | |
| JP | 2008-123046 | A | 5/2008 | |
| JP | 2011-192186 | A | 9/2011 | |
| KR | 10-2016-0020265 | A | 2/2016 | |
| WO | WO-9705556 | A1 * | 2/1997 | G06Q 10/087 |
| WO | WO-2007073334 | A1 * | 6/2007 | G06F 3/147 |
| WO | WO-2009094033 | A1 * | 7/2009 | G06Q 10/087 |
| WO | WO-2009119686 | A1 * | 10/2009 | G06Q 10/087 |
| WO | WO-2010008378 | A1 * | 1/2010 | G06Q 30/06 |
| WO | WO 2010/137883 | A2 | 12/2010 | |
| WO | WO 2011/124751 | A1 | 10/2011 | |
| WO | WO-2013053999 | A1 * | 4/2013 | G06K 7/10158 |
| WO | WO 2013/153282 | A1 | 10/2013 | |

OTHER PUBLICATIONS

Chunhui, Zhou, et al. "An electronic shelf label system based on WSN." Proc. Int. Conf. Syst. Eng. Modeling (ICSEM). 2013. (Year: 2013).*

Evans, James G., et al. "A low-cost two-way radio transceiver." 1998 URSI International Symposium on Signals, Systems, and Electronics. Conference Proceedings (Cat. No. 98EX167). IEEE, 1998. (Year: 1998).*

Evans, James G., et al. "A low-cost radio for an electronic price label system." Bell Labs Technical Journal 1.2 (1996): 203-215. (Year: 1996).*

International Search Report (PCT/ISA/210) issued in PCT/FI2017/050316, mailed on Aug. 23, 2017.

Written Opinion (PCT/ISA/237) issued in PCT/FI2017/050316, mailed on Aug. 23, 2017.

English translation of the Japanese Office Action, dated Apr. 20, 2021, for Japanese Application No. 2018-557085.

(56) References Cited

OTHER PUBLICATIONS

English translation of the Korean Office Action, dated Jul. 8, 2021, for Korean Application No. 10-2018-7035091.
Chinese Office Action and Search Report for corresponding Chinese Application No. 201780031437.3, dated Sep. 2, 2022, with English translation.

* cited by examiner

Fig. 2

SIMULTANEOUSLY DISPLAYING NEW PRICES LINKED TO PRODUCTS VIA AN ELECTRONIC PRICE LABEL SYSTEM

CROSS REFERENCE TO RELATED APPLICATIONS

This application is the National Phase of PCT International Application No. PCT/FI2017/050316, filed on Apr. 26, 2017, which claims priority to U.S. patent application Ser. No. 15/146,322, filed on May 4, 2016, which is hereby expressly incorporated by reference into the present application.

FIELD OF THE INVENTION

The invention relates to electronic price label systems.

BACKGROUND OF THE INVENTION

Conventionally, the price information on price tags in shops is always changed manually when the price of the product is changed. The new prices are printed out on paper or a corresponding material, and these tags with their new price markings are placed manually to the products in the sales premises. Thus, an employee must first find the correct product and the price tag to be updated, after which the new price tag is inserted in its position. A disadvantage in this arrangement is, among other things, the fact that the arrangement is very laborious and there is a high risk of mistakes. In case of a mistake, a situation may, for example, occur, in which the price information on the price tags on the products conflicts with the price information in the cash register system.

To avoid the above mentioned drawbacks, electronic systems have been developed, in which electronic labels and their electronic displays are attached to the products, in which the price information of the products can be changed in a centralized manner from the control centre of the system, or the like. This will facilitate and accelerate the updating of the price information to a significant extent.

Also Point-of-Sale (POS) systems are used in the retail environment. The POS-systems of the prior art are used in various retail situations and they are implemented with hardware and software tailored to their particular requirements. Retailers may utilize weighing scales, scanners, electronic and manual cash registers, EFTPOS terminals, touch screens and a variety of other hardware and software available. POS software may also include additional features to cater for different functionality, such as inventory management, CRM, financials, warehousing, etc.

It's also known to use inventory or stock control systems in retail environment. Typical features of stock control systems include e.g. ensuring that the products are on the shelf in shops in just the right quantity, recognizing when a customer has bought a product, signaling when more products need to be put on the shelf from the stockroom, reordering stock at the appropriate time from the main warehouse, producing management information reports that could be used both by the store and also at head office.

With above described prior art systems when the pricing is wanted to change it has to be done manually for every product e.g. via the POS-system. This is very time-consuming because the number of different types of products in the store is large.

SUMMARY OF THE INVENTION

It is an aim of the present invention to reduce the above-mentioned problems and simultaneously provide an arrangement for an electronic price label system.

The method according to the invention and the label system according to the invention are presented in independent claims. Other embodiments of the invention are characterized in what will be presented in the other claims.

In the solution of the invention a new price of a product is sent to an electronic price label linked to the product. The received new price of a product is stored by the electronic price label. The electronic price label changes the displayed price to the received new price in response to receiving a price activation signal from the electronic price label system, e.g. from base station of the electronic price label system. In one embodiment of the invention the price activation signal is sent as a broadcast message from the electronic price label system, e.g. the base station of the electronic price label system. In this embodiment one command can be used to inform multiple electronic price labels at the same time that they should change the displayed price and this way the price change can be implemented quickly.

With one embodiment of the electronic price label system of the present invention, the system can automatically calculate a new price for the product. The new price is based at least in part on a current price of the product, a ratio of the currently used sales time to the total length of the sales season, and a ratio of the number of sold products in the previous observation time frame, e.g. a week, to the planned number of sold products in the observation time frame. The determined new price for the product can be sent to the electronic price label linked to the product. The observation time frame in the system can be e.g. a day, certain number of days, a week, certain number of weeks, a month or certain number of months. The observation time frame can be different for different products and/or customers.

In one embodiment of the invention the new price for a product is determined on the basis of the following equation:

$$B2=B1*(1+(Pf*w/Tw)*(((Cw+Fw)/2)-Cw)/Cw),$$

wherein B2 is a new sales price, B1 is a previous sales price, Pf is a progress factor, w is a currently used sales time, e.g. number of sales weeks from the start of the sales, Tw is a planned sales time, e.g. in weeks, Cw is a planned average sales (pcs) per observation timeframe, e.g. a week, and Fw is a number of sold products during previous observation timeframe, e.g. previous week.

In one embodiment of the invention the new price is based at least in part on a current price of the product, a ratio of the currently used sales time to the total length of the sales season, and a ratio of the revenue of sold products in the previous observation time frame, e.g. a week, to the planned revenue of sold products in the observation time frame.

In one embodiment of the invention the new price for a product is determined on the basis of the following equation:

$$B2=B1*(1+(Pf*w/Tw)*(((Cw+Fw)/2)-Cw)/Cw),$$

wherein B2 is a new sales price, B1 is a previous sales price, Pf is a progress factor, w is a currently used sales time, e.g. number of sales weeks from the start of the sales, Tw is a planned sales time, e.g. in weeks, Cw is a planned average sales revenue (e.g. €) per observation timeframe, e.g. a week, and Fw is realized sales revenue (e.g. €) during previous observation timeframe, e.g. previous week.

In one embodiment of the invention the electronic price label system comprises a minimum price and/or maximum price for a product and if the determined new price would be less than the set minimum price, the set minimum price is used as a new price for a product and/or if the determined new price would be more than the set maximum price, the set maximum price is used as a new price for a product.

In one embodiment of the invention the electronic label is an electronic label which is configured to be attached to a product.

In one embodiment of the invention a new price for the product is sent to the electronic price label during an inventory check.

The solution of the present invention is able to automatically calculate and change the prices of the products based on predefined rules and thus the system reduces manual pricing work which is needed with the prior art systems. When price of a certain product is changed the price information will be changed in the electronic price label system and this information will be delivered through the base stations to individual electronic labels.

DESCRIPTION OF THE DRAWINGS

In the following, the invention will be described in more detail by means of example embodiments with reference to the appended drawings, in which FIG. 2 presents an example chart according to one embodiment of the invention where different values of the automatic price calculation are presented.

DETAILED DESCRIPTION OF THE INVENTION

Figure 1:
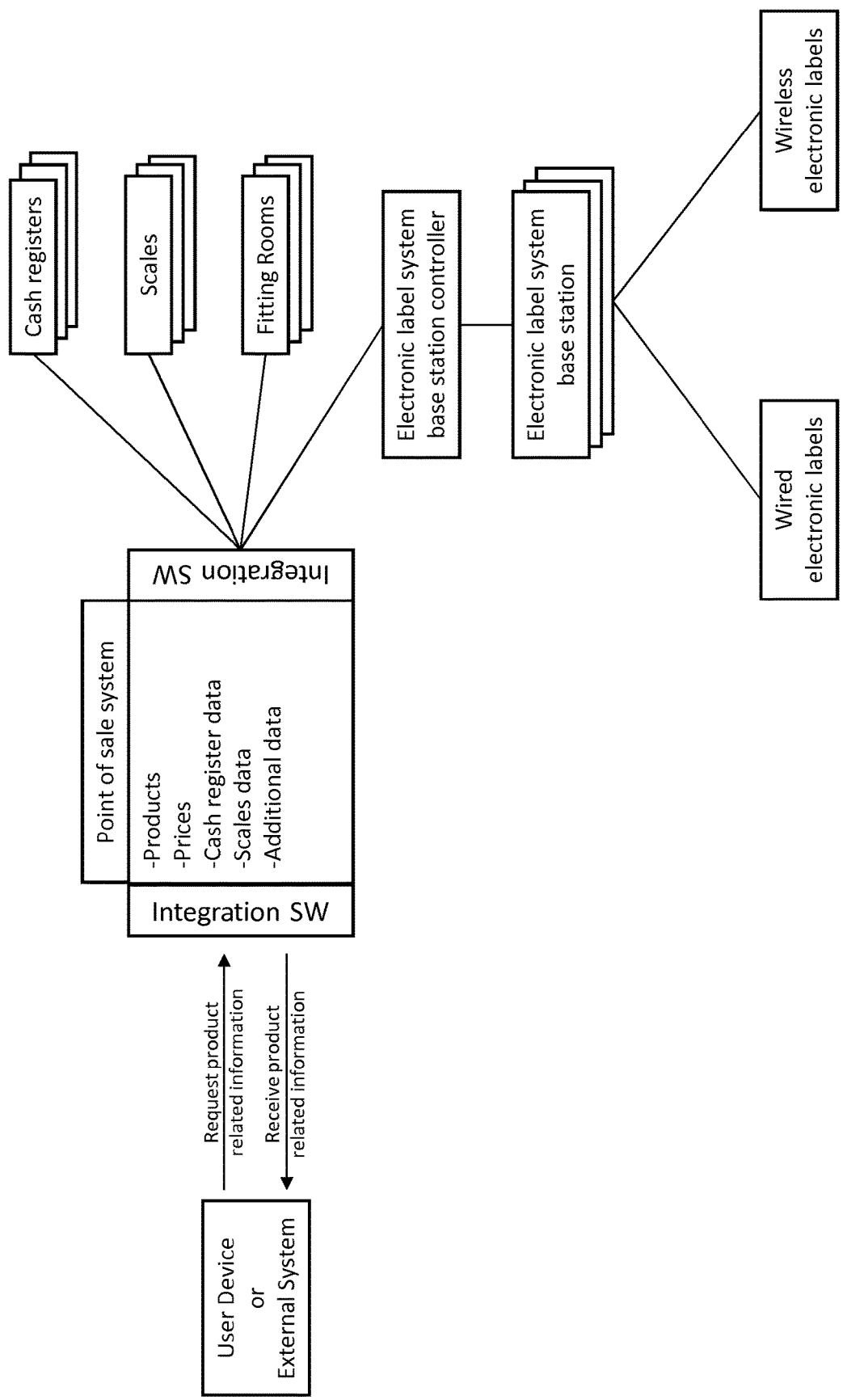
FIG. 1 presents an example implementation of an electronic price label system.

FIG. 1 presents an example implementation of the electronic price label system. The system comprises an electronic price label system and a product database in which products are listed (product database not shown in the FIG. 1). The electronic price label system can also comprise a point of sale system or be connected to a point of sale system.

Point of sale system is used to manage prices, stock, scales data, cash register data or other similar sale or product related data of a store. A user device can communicate with the point of sale system of a store through an interface. The point of sale system can be connected through an interface also to cash registers, scales and an electronic price label system. Through the interface, the point of sale system can update information on cash registers and scales or gather information on activities such as sales on the cash registers or scales.

The electronic price label system, connected to the point of sale system, can be used to change and present prices to the customers. The electronic price label system can comprise electronic price label system base station controller, one or more base stations and one or more electronic price labels. Base stations of the electronic price label system are installed in stores and are typically connected in a wired manner, for example, via Ethernet connection to the base station controller. The base station controller is further connected to a store level server containing the price and other product information. A specific product can be linked to a specific electronic price label in the product database of the system.

The electronic price label system is able to calculate prices of the products automatically based on user changeable parameters and information collected with the electronic price label system and/or point-of-sale system. The system is able to change prices so that the revenue and profit can be optimized, e.g. in such a way that essentially all the products are sold in the normal store during the normal sales period and sales out period. If this can be achieved, none of the products have to be sold at an outlet store and the revenue and profit can be kept higher.

The changeable parameters can be set e.g. in the following manner. The target number of sold products for sales season and the length of the sales season (e.g. in days, weeks or months) can be set to the system. After that the system is able to calculate a target value of an average number of sold products for a certain observation timeframe of the sales season, e.g. sold items per day, week or month. Also a starting price for a product should be set to the system. Based on this information and information collected with the electronic price label system and/or point-of-sale system the system can automatically calculate and change the prices.

The system can calculate a new price for the product based at least in part on a current price of the product, a ratio of the currently used sales time to the total length of the sales season, and a ratio of the number of sold products in the previous observation time frame, e.g. a week, to the planned number of sold products in the observation time frame. The determined new price for the product is sent to the electronic price label linked to the product.

In one embodiment of the system a new price is calculated on the basis of the following equation:

$$B2 = B1 * (1 + (Pf * w/Tw) * (((Cw + Fw)/2) - Cw)/Cw)$$

wherein in the equation:
B2=new sales price,
B1=previous sales price,
Pf=progress factor,
w=currently used sales time, e.g. number of sales weeks from the start of the sales,
Tw=planned sales time, e.g. in weeks,
Cw=planned average sales (pcs) per observation timeframe, e.g. a week,
Fw=number of sold products during previous observation timeframe, e.g. previous week.

The progress factor can be used to determine the steepness of the price change. If the value of the progress factor is 0, prices are not changed. Value 1 can be used as a basic value for the progress factor which can be adjusted if needed. With progress factor values over 1 the price change is bigger (i.e. steeper) than with the value 1. With progress factor value less than 1 the price change is smaller than with the value 1.

In one embodiment of the invention a minimum price and/or a maximum price for a product can be set to the system, e.g. for the current sales season. If the calculated price would be below the set minimum price, the set minimum price is used. If the calculated price would be above the set maximum price, the set maximum price is used.

Figure 2:
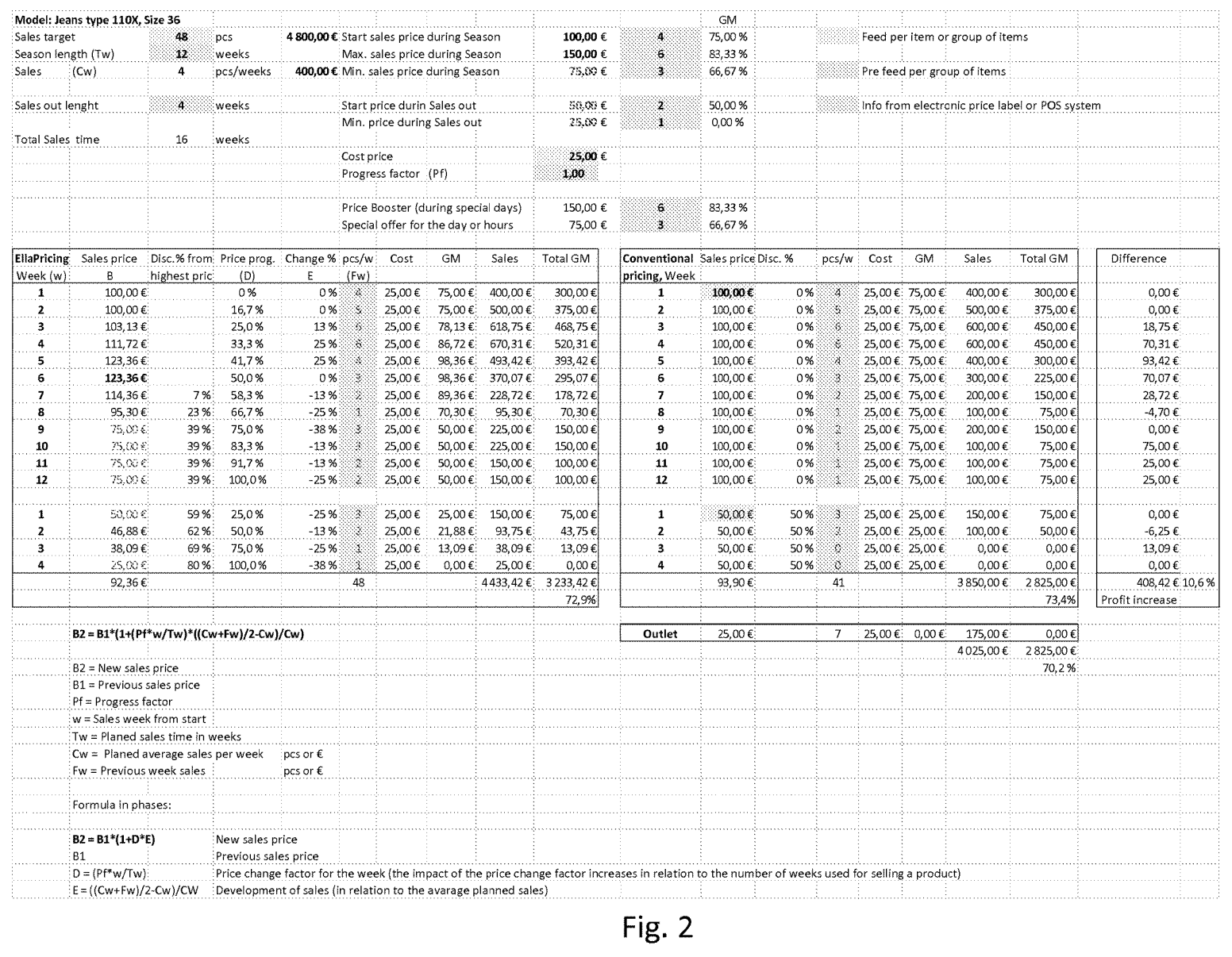

FIG. 2 presents an example chart according to one embodiment of the invention where different values of the automatic price calculation are presented on the left side of the chart. The prior art pricing method is presented as a comparison on the right side of the chart.

The target number of sold products for sales season (sales target (pcs)) and the length of the sales season Tw (e.g. in days, weeks or months) can be set to the system. After that the system is able to calculate planned average number of sold products Cw for a certain observation timeframe of the sales season, e.g. sold items per day, week or month. Also in the charts are presented, for one embodiment of the invention, the sales target as revenue and calculated planned sales Cw as revenue for a certain observation timeframe.

Also a starting price for a product should be set to the system. Based on this information and information collected with the electronic price label system and/or point-of-sale system the system can automatically calculate and change the prices based. Also the optional maximum sales price during season and minimum sales price during season can be set.

Progress factor Pf can be changed to determine the steepness of the automatic price change.

Original cost price for a product (cost for the store for buying the product from the manufacturer) is also shown in the chart so that the profit and price can be compared to the cost of the product.

Price Booster (during special days) setting can be used to change the price higher to a predefined value, e.g. for a day or time of the day when the sales are presumed to be high. Also a special offer for the day or certain hours of the day can be used to set the price lower.

The new price can be calculated with the same parameters to a group of products, wherein a group of products consists of different variants of same product, e.g. different size and/or color of same product. The new price can be calculated individually for every product, e.g. different sizes of the same product type.

The system can have different sales related periods and the price can be calculated with different parameters during these sales periods. Some parameters can be used unchanged in these different sales related periods. An example of two different sales related periods, presented e.g. in FIG. 2, is normal sales season and sales out season. For example starting price, minimum price and/or maximum price for a product can be different in the sales out season when compared to the normal sales season. Also the length of the sales period can be different in normal sales season and sales out season.

Figure 3:
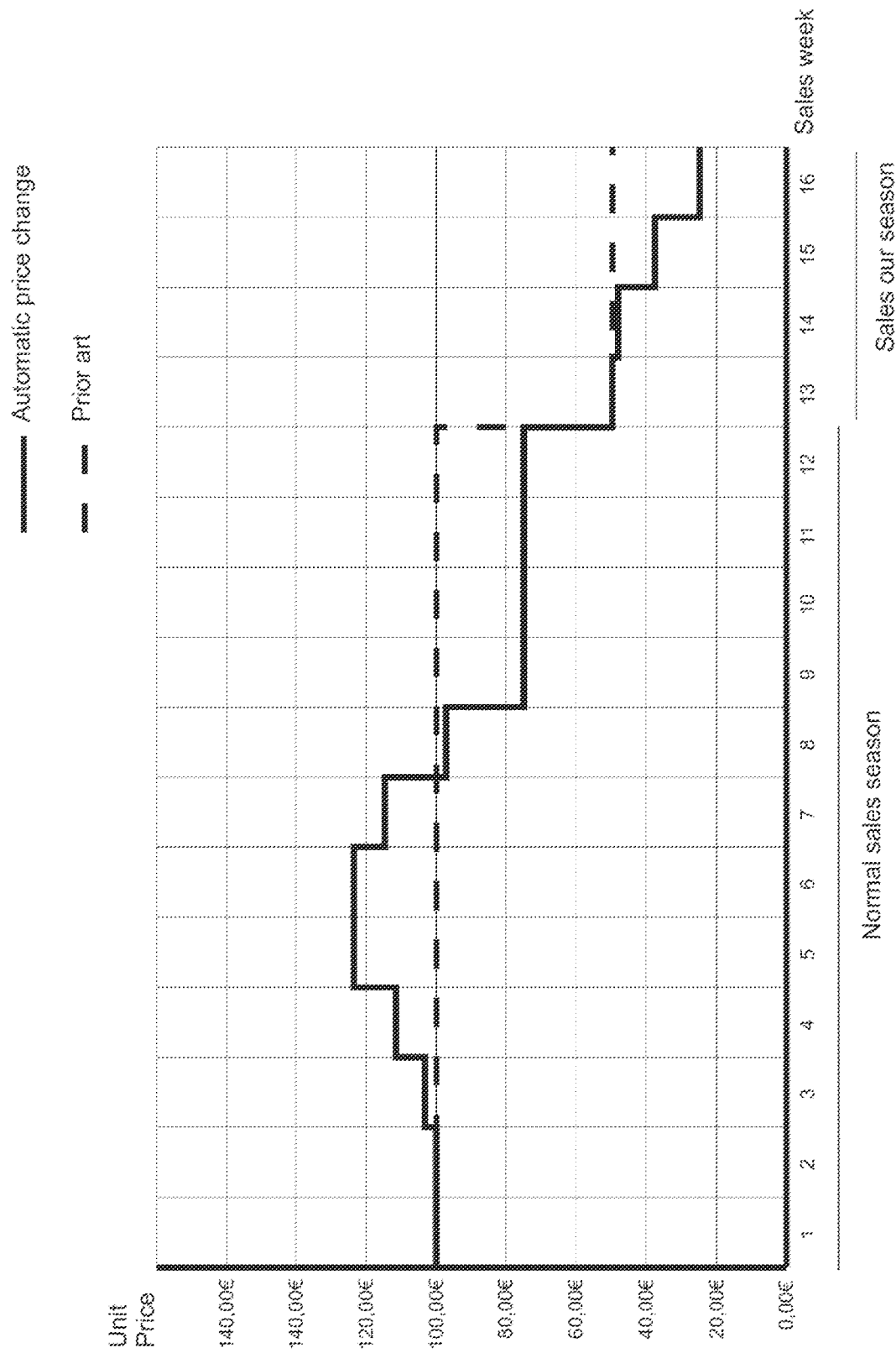
FIG. 3 presents an example chart according to the embodiment of the invention of FIG. 2 where the automatically calculated price is illustrated.

FIG. 3 presents an example chart according to the embodiment of the invention presented in FIG. 2. In the chart of FIG. 3 the automatically calculated price is illustrated for every week. The prior art pricing method is presented as a comparison.

In one embodiment of the invention instead using planned average sales number of products sold per observation timeframe (Cw) and number of sold products during previous observation timeframe (Fw) as described above, the system can use realized sales (revenue) during previous observation timeframe and planned average sales (revenue) in observation timeframe. In this case the system functions and calculates the new price in similar fashion as presented above but the new price is based at least in part on the current price of the product, a ratio of the currently used sales time to the total duration of the sales season, and the ratio of the revenue created from the sold products in the previous observation time frame, e.g. a week, to the planned revenue of sold products in the observation time frame. The preceding equation $B2=B1*(1+(Pf*w/Tw)*(((Cw+Fw)/2)-Cw)/Cw)$ can also be used with this embodiment and in this case the Cw is planned revenue of sold products in the observation time frame and Fw is the revenue created from the sold products in the previous observation time frame. All the other variables are same as described above.

When a user device or an external system wants to receive information about a certain product or plurality of products, the user device or external system requests information about the status of the electronic price labels and/or the products linked to the electronic price labels. The electronic price label system receives the query request about status of the electronic price labels and/or the products linked to the electronic price labels and sends information as a response about the products which are in the first state and information about the products which are in the second state as a response to the received query request. The electronic price label system can also send other information such as statistics related to a product, an electronic label related to a product and/or any other information such as other statistic information.

The electronic price label system can be scheduled to automatically make an inventory check or query of all the products in the store e.g. periodically for example every night, daily and/or weekly. This way daily reliable inventory information of all products in the store and/or warehouse is available. This information is much more reliable than with the prior art systems where the inventory is usually manually checked once or twice the year.

In one embodiment of the invention the new price can be sent in one embodiment of the invention during an inventory check. In one embodiment of the invention the new price is submitted to the electronic price label as a data file which contains the new price. The data file can be sent in one embodiment of the invention during an inventory check. Inventory check and/or sending prices can in one embodiment of the invention be carried out continuously and e.g. so that when all the products are inventoried and/or all the price changes have been transmitted to the electronic price labels, a new inventory check and/or sending of prices to the electronic price labels is carried out again. Inventory check and/or transferring new prices to electronic price labels can be done in the background, e.g. during the day and/or during the night.

The inventory check can be carried out at the same time when transferring new prices to the electronic price labels, e.g. by sending new prices to electronic labels and checking the inventory based on the received acknowledge messages from the electronic price labels for successful reception of a new price. In one embodiment of the invention the new price can be same as the old price.

The electronic price label system can be also used to recognize certain events or patterns, e.g. related to loss of products by comparing detected inventory information to the sales information. Because the inventory can be checked easily, e.g. every day and/or night, certain days can be recognized when there are more losses of products than on the average. Based on this information the reasons for the losses can be found out.

The regular and optionally periodical inventory query can be used check and report the sales of certain products. The model, size and/or color of the product can be recognized in the electronic price label system and based on this the system can create report of model, size and/or color of the products which are sold well and fast and model, size and/or color of the products which are not selling well.

Figure 4:
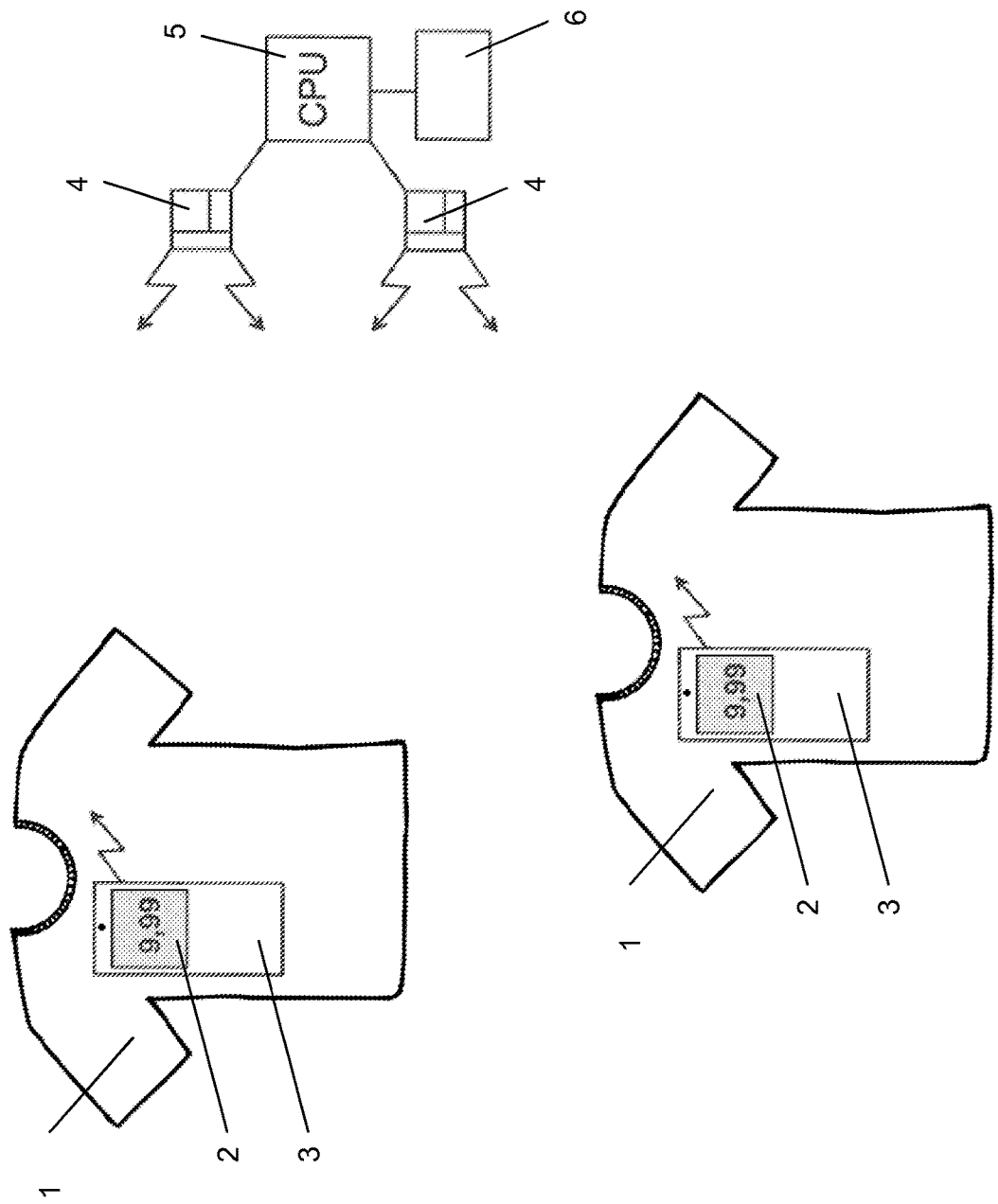
FIG. 4 presents a schematic and simplified view of an example arrangement of the electronic price label system in a store or in corresponding sales premises.

FIG. 4 shows schematically, as an example, a typical arrangement of the electronic price label system in a store or similar sale environment.

Products 1 are equipped with electronic labels 3 which comprise a display 2. The electronic labels 3 are typically attached to the products with different kind of fixing means. The display 2 is arranged to display the price of the product, and the product information contains, among other things, the name of the product and possibly some other information relating to the product. The electronic price label 3 can also have a separate indication marking, e.g. color-marking, which can indicate product related information such as a sale promotion for the product, sale promotion to regular customers for the product and/or a new product.

Each electronic display 2 can constitute a thin price tag equipped with display segments and/or pixels and resembling a paper price tag, in which the required product prices and other necessary symbols are formed by changing the color of the substantially two-colored or multicolored display segments.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192.

Furthermore, the electronic price label system comprises at least a central processing unit 5 connected to a base station 4 or other communication means, via which it is possible to transmit, for example, updated price information and other control information to the display 2. Furthermore, the system may comprise scanners 6 located at cash registers and connected to the cash register system, for scanning the price, wherein the cash register system and the electronic labels always have the same up-to-date information on the prices of the products. Furthermore, the central processing unit 5 may be coupled to other controlling and supporting systems, e.g. to a point of sale system of a store. The wireless connection between the central processing unit 5 and the electronic labels 3 is illustrated with arrows.

The electronic labels 3 can have multiple memory locations for the information, for example for price information. The electronic labels 3 can also comprise multiple different views stored in the memory locations i.e. different pages that include different information to be displayed.

The electronic labels 3 communicate in a wireless manner with the base station 4 shown in FIG. 2. This wireless communication method may be based on any known wireless communication technology, but in order to save battery life of the electronic labels 3, passive backscatter radio communication is preferred. In this approach the base stations 4 actively send radio signals and instead of answering with active radio transmission, the electronic labels 3 do not use a radio transmitter; instead, they answer by modulating the reflected power of the base station signal. The modulation is achieved, typically, by changing the load state of the antenna in the electronic labels 3, for example, by connecting and disconnecting the antenna between the ground and non-ground potential. This modulation of the backscattered signal allows for the electronic labels 3 to answer to the base stations and further to the store level server.

Each electronic label 3 can be identified by its own identification code that the electronic label 3 in question knows to listen for in the transmission from the base station 4. After receiving new information, instructions or commands from the store server via base station 4, the electronic label 3 can acknowledge the reception of these instructions by using the reflected backscattering modulated properly and timely for the store level server to identify that the response is coming from the electronic label 3 is question. To facilitate that the store server may have a certain listening period after a transmission directed to a certain electronic label 3 for giving the module possibility to answer during that time.

In the solution of the invention, when receiving a new price, the electronic price labels don't have to change the displayed price immediately but they can store the received new price and wait for a price activation signal from the electronic price label system, e.g. from base station of the electronic price label system. The activation message can be transferred from the electronic price label system, e.g. from base station of the electronic price label system, to the price labels of the system by broadcasting the activation message. This way all the electronic price labels can change the displayed price from old price to new price essentially simultaneously. Price information can be transferred to the electronic price labels in the background, e.g. during the day or during the night, and optionally at the same time with inventory check. Without broadcasting price activation signal and in the situation where the electronic price labels would show the new price immediately upon receiving the new price, the prices would not be changed at the same time in all electronic price labels. This is because of the fact that the sending and confirming prices to all price labels can take a long time, e.g. many hours in some cases.

The database of the electronic label system can have many different kind of information relating to the products and electronic labels linked to products. E.g. the following information can be stored to the database and/or electronic price labels:

File/Entity 1: Contains the prices and quantities of the latest inventory. A new inventory will be made based on this information Prices can be shown on the display of electronic price label in the shop.

File/Entity 2: Contains information about new prices which are transmitted to the electronic price label, e.g. during inventory check. The prices can be determined and sent for example from the price optimization program, POS and/or electronic price label system.

File/Entity 3: Contains information about the new, acknowledged prices from the electronic price labels, received e.g. during the inventory check. New prices transferred to the electronic price labels are stored to the price labels. Inventory check and/or transfer of process can be carried out also during the time when the shop is open. The electronic price label can show the old price on its display even if it has received the new price and change the displayed price to the new price when it receives a command from the electronic label system to change the displayed price. The command can be broadcasted to all electronic labels of the system and then all the electronic labels can change the displayed price essentially at the same time.

File/Entity 4: Contains information about all products sold during the day.

File/Entity 5: Contains information about all products removed from the shop.

File/Entity 6: Contains all products brought to the shop as replenishment products (e.g. complementary products) during the day. If the same price label has been attached to a different product during the same day, the time can be registered to the electronic label system, e.g. its database, because that electronic label may have been included in an inventory check already.

File/Entity 7: Contains information about all products added to the shop.

File/Entity 8: Contains information about the number of a product (any time during a day). File/Entity 8 can be calculated by subtracting the count of products in File/Entity 4 from the count in File/Entity 1, and adding the counts from File/Entity 6 and File/Entity 7 to the count of File/Entity 1.

The starting point for the next day's new inventory can be the following: 1) the price for inventory has been inserted and acknowledged in File/Entity 3, 2) the products contained in File/Entity 4 and File/Entity 6 will be subtracted from the File/Entity 3 and 3) the products contained in File/Entity 6 and 7 will be added to the File/Entity 3.

Eventually, the change of the inventory is the difference of counts in File/Entity 1 and in File/Entity 3.

File/Entity 9: Contains information about not found or stolen labels as compared with the original inventory. This can also show the difference between the past inventory and if products, which were not found in the previous inventory, are found.

The next day the File/Entity 1 and 3 can be swapped and the inventory check will be done as described above.

File/Entity 10: Contains special offers which can be used e.g. for a certain day and/or for certain hours during a day.

It is clear for a person skilled in the art that the software applications, communicational functions and other functions of the system described schematically in FIGS. 1 and 3 can be arranged in a wide variety of different ways depending on the details of the application in question. FIGS. 1 and 3 only aim to provide a high level illustration as an example to aid for understanding the benefits of the invention described here.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. A method for an electronic price label system, the electronic price label system comprising a plurality of electronic price labels, a base station controller, at least one base station and a product database in which products are listed, wherein the plurality of electronic price labels are electronic price labels which are attached to products, said method comprising the steps of:

automatically performing an inventory check or query of the products in a store that is scheduled periodically by the electronic price label system, and updating the product database regarding prices and quantities of a latest inventory obtained from the electronic price label system, new prices transmitted to the electronic price labels and information about changes of the products occurred since the latest inventory;

determining the new prices for a product, wherein the new prices are determined at least in part based on sales of the product or at least in part based on sales of a group of products, and the sales of the product or the sales of the group of products are determined based on the inventory check or query and/or by collecting product sales information from point-of-sale system;

sending the new prices of the product to a respective electronic price label of the plurality of electronic price labels linked to the product;

storing the received new prices of the product by the respective electronic price label, wherein the respective electronic price label comprises multiple memory locations for storing the received new prices of the product;

waiting by the electronic price labels for a price activation signal from the electronic price label system; and changing a displayed price at the respective electronic price label to a received new price in response to receiving the price activation signal from the base station of the electronic price label system, all of the plurality of electronic price labels changing the displayed prices to the received new prices simultaneously in response to the price activation signal, wherein the price activation signal is sent as a broadcast message from the base station of the electronic price label system, wherein the plurality of electronic price labels are attached to the products, and wherein the inventory check is carried out at a same time when transferring new prices to the electronic price labels, and is carried out based on received acknowledge messages from the electronic price labels for successful reception of the new prices.

2. The method according to claim 1, wherein the new prices for the product are sent to the electronic price label during an inventory check.

3. The method according to claim 1, wherein the new prices for the product are sent to the electronic price label at predefined times.

4. The method according to claim 1, wherein the new prices for the product are sent to the electronic price label via wireless communication.

5. The method according to claim 1, wherein the new prices for the product are sent to the electronic price label as a data file.

6. The method according to claim 1, wherein the electronic price label system determines the new prices for the product based at least in part on:

a current price of the product;

a ratio of the currently used sales time to the total duration of the sales season; and a ratio of the sales (number of products or revenue) of the products in a previous observation time frame to the planned sales (number of products or revenue) of products in the observation time frame.

7. The method according to claim 6, wherein the new prices for the product is determined on the basis of the following equation:

$$B2 = B1 * (1 + (Pf*w/Tw) * (((Cw+Fw)/2) - Cw)/Cw), \text{ and}$$

wherein:

B2 is a new sales price;
B1 is a previous sales price;
Pf is a progress factor;
w is a currently used sales time;
Tw is a planned sales time;
Cw is planned sales (number of products or revenue) of products per observation timeframe; and Fw is sales (number of products or revenue) of products during previous observation timeframe.

8. The method according to claim 6, wherein the electronic price label system comprises a minimum price and/or maximum price for a product and if the determined new price would be less than the set minimum price, the set minimum price is used as a new price for a product and/or if the determined new price would be more than the set maximum price, the set maximum price is used as a new price for a product.

9. The method according to claim 1, wherein each of the plurality of electronic price labels includes multiple different views stored in the memory locations to display the new prices.

10. The method according to claim 1, wherein the electronic price labels answer the broadcast message from the base station by modulating a reflected power of a base station signal through changing a load state of antennas in the electronic price labels, wherein changing the load state of the antennas in the electronic price labels includes connecting and disconnecting the antennas between ground and non-ground potential.

11. An electronic price label system comprising a base station controller, at least one base station, a plurality of electronic price labels and a product database in which products are listed, wherein
the electronic price label system is configured to automatically perform an inventory check or query of the products in a store that is scheduled periodically by the electronic price label system, and update the product database regarding prices and quantities of a latest inventory obtained from the electronic price label system, new prices transmitted to the electronic price labels and information about changes of the products occurred since the latest inventory;
the plurality of electronic price labels are electronic price labels which are configured to be attached to products;
the electronic price label system is configured to determine the new prices for a product, and send the new prices of the product to a respective electronic price label of the plurality of electronic price labels linked to the product, wherein the new prices are determined at least in part based on sales of the product or at least in part based on sales of a group of products, and the sales of the product or the sales of the group of products are determined based on the inventory check or query and/or by collecting product sales information from point-of-sale system;
the respective electronic price label is configured to store the received new prices of the product, wherein the respective electronic price label comprises multiple memory locations for storing the received new prices of the product;
the respective electronic price label is configured to wait for a price activation signal from the electronic price label system; and
the respective electronic price label is configured to change the displayed price to the received new price in response to receiving the price activation signal from the base station of the electronic price label system,
wherein the electronic price label system is configured to send the price activation signal, as a broadcast message, from the base station of the electronic price label system,
wherein all of the plurality of electronic price labels change the displayed prices to the received new prices simultaneously in response to the price activation signal,
wherein the plurality of electronic price labels are attached to the products, and
wherein the inventory check is carried out at a same time when transferring new prices to the electronic price labels, and is carried out based on received acknowledge messages from the electronic price labels for successful reception of the new prices.

12. The electronic price label system according to claim 11, wherein the electronic price label system is configured to send the new prices for the product to the electronic price label during an inventory check.

13. The electronic price label system according to claim 11, wherein the electronic price label system is configured to send the new prices for the product to the electronic price label at predefined times.

14. The electronic price label system according to claim 11, wherein the electronic price label system is configured to send the new prices for the product to the electronic price label via wireless communication.

15. The electronic price label system according to claim 11, wherein the electronic price label system is configured to send the new prices for the product to the electronic price label as a data file.

16. The electronic price label system according to claim 11, wherein the electronic price label system is configured to determine the new price for the product based at least in part on:
a current price of the product;
a ratio of the currently used sales time to the total duration of the sales season; and
a ratio of the sales (number of products or revenue) of the products in a previous observation time frame, to the planned sales (number of products or revenue) of products in the observation time frame.

17. The electronic price label system according to claim 16, wherein the electronic price label system is configured to determine the new prices for a product on the basis of the following equation:

$$B2 = B1*(1+(Pf*w/Tw)*(((Cw+Fw)/2)-Cw)/Cw), \text{ and}$$

Wherein:
B2 is a new sales price;
B1 is a previous sales price;
Pf is a progress factor;
w is a currently used sales time;
Tw is a planned sales time;
Cw is a planned sales (number of products or revenue) of products per observation timeframe; and
Fw is sales (number of products or revenue) of products during previous observation timeframe.

18. The electronic price label system according to claim 16, wherein the electronic price label system comprises a minimum price and/or maximum price for a product and if the determined new price would be less than the set minimum price, the electronic price label system is configured to use the set minimum price as a new price for a product and/or if the determined new price would be more than the set maximum price, the electronic price label system is configured to use the set maximum price as a new price for a product.

19. The system according to claim 11, wherein each of the plurality of electronic price labels includes multiple different views stored in the memory locations to display the new prices, wherein the new prices for the product are sent to the electronic price label as a data file, and the inventory check and the sending of the data file are carried out continuously, and wherein each electronic price label includes and is identified by an identification code such that after receiving new information, instructions or commands from a store service via the base station, the electronic price label acknowledges reception of the new information, instructions or commands by using a reflected backscattering modulation technique for a store server to identify that a response is coming from the respective electronic price label.

20. The system according to claim 11, wherein the electronic price labels answer the broadcast message from the base station by modulating a reflected power of a base station signal through changing a load state of antennas in the electronic price labels, wherein changing the load state of the antennas in the electronic price labels includes connecting and disconnecting the antennas between ground and non-ground potential.

\* \* \* \* \*